US009273791B2

(12) United States Patent
Vandamme et al.

(10) Patent No.: US 9,273,791 B2
(45) Date of Patent: Mar. 1, 2016

(54) PILOT SOLENOID VALVE

(75) Inventors: Richard Vandamme, Cintray (FR);
Pascal Moreau, Le Coudray (FR);
Jean-Pierre Gomez, Amilly (FR)

(73) Assignee: ASCO JOUCOMATIC SA (FR)

( * ) Notice: Subject to any disclaimer, the term of this patent is extended or adjusted under 35 U.S.C. 154(b) by 323 days.

(21) Appl. No.: 13/576,238

(22) PCT Filed: Jan. 31, 2011

(86) PCT No.: PCT/IB2011/050415
§ 371 (c)(1),
(2), (4) Date: Jul. 31, 2012

(87) PCT Pub. No.: WO2011/095928
PCT Pub. Date: Aug. 11, 2011

(65) Prior Publication Data
US 2012/0298896 A1 Nov. 29, 2012

(30) Foreign Application Priority Data

Feb. 2, 2010 (FR) ...................................... 10-00398

(51) Int. Cl.
*F16K 31/06* (2006.01)
(52) U.S. Cl.
CPC ......... *F16K 31/0627* (2013.01); *F16K 31/0655* (2013.01)
(58) Field of Classification Search
CPC ............ F16K 31/0606; F16K 31/0655; F16K 31/0663

USPC ............ 251/129.15, 129.16, 30; 137/625.27, 137/625.65, 625.26; 335/281, 297
See application file for complete search history.

(56) References Cited

U.S. PATENT DOCUMENTS

| | | | | |
|---|---|---|---|---|
| 3,508,568 A | * | 4/1970 | Kowalski et al. | 137/116.3 |
| 3,921,670 A | * | 11/1975 | Clippard et al. | 137/625.65 |
| 4,076,045 A | * | 2/1978 | Nakajima et al. | 137/625.65 |
| 4,196,751 A | * | 4/1980 | Fischer et al. | 137/625.65 |
| 4,210,890 A | * | 7/1980 | Olsen | 335/281 |
| 5,306,076 A | * | 4/1994 | Tyler | 303/118.1 |
| 5,374,029 A | * | 12/1994 | Bailey | 251/129.16 |
| 6,220,569 B1 | * | 4/2001 | Kelly | 251/129.08 |
| 6,305,355 B1 | * | 10/2001 | Hoffmann et al. | 123/467 |
| 8,128,060 B2 | * | 3/2012 | Mullally | 251/129.16 |
| 2003/0183289 A1 | | 10/2003 | Seuret et al. | |

FOREIGN PATENT DOCUMENTS

DE          20205488 U1    8/2003
DE    102007059054 A1    6/2009

(Continued)

OTHER PUBLICATIONS

Corresponding Japanese Office Action dated Oct. 10, 2014.

*Primary Examiner* — Kevin Murphy
*Assistant Examiner* — Daphne M Barry
(74) *Attorney, Agent, or Firm* — The Belles Group, P.C.

(57) ABSTRACT

The invention relates to a solenoid valve including an electromagnet (17, 4, 3, 10) made of a flat movable core (10), a fixed core (3) and a coil (17), the solenoid valve comprising a body (4) which also belongs to the electromagnet and includes an opening (23) located at the rear of the body (4), opposite the supply opening (18), for inserting the flat movable core (10), the fixed core (3) and the coil (17). The body (4) is secured to a retaining ring (8) made of a non-magnetic material, a flat spring (9) being compressed between the retaining ring (8) and the flat movable core (10).

19 Claims, 17 Drawing Sheets

(56) References Cited

FOREIGN PATENT DOCUMENTS

Figure 3:
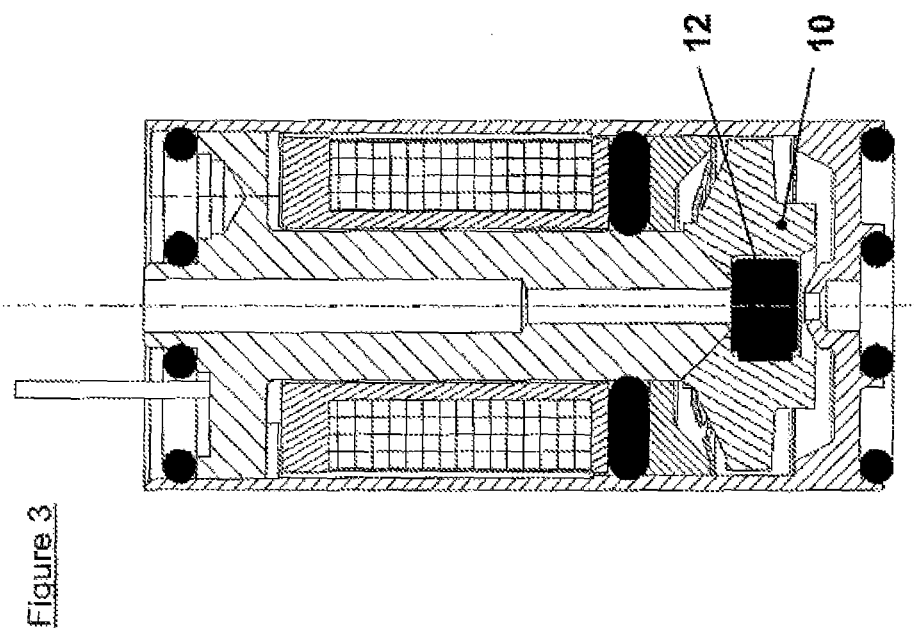

| EP | 0549490-1 | 6/1993 |
| EP | 1217272 B1 | 6/2002 |
| EP | 1350999 B1 | 10/2003 |
| EP | 1536169 A1 | 6/2005 |
| JP | 58214084 A | 12/1983 |
| JP | 10318413 | 12/1998 |
| WO | WO-2008028509 | 3/2008 |

* cited by examiner

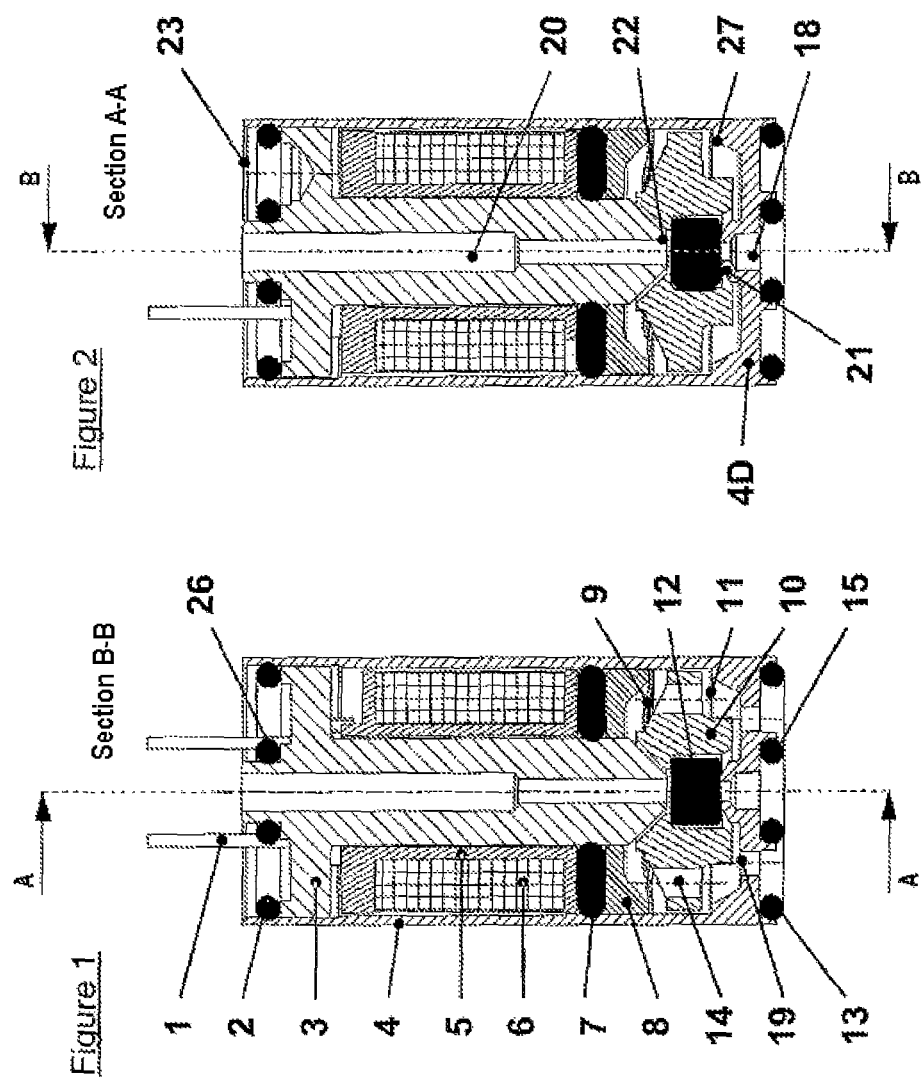

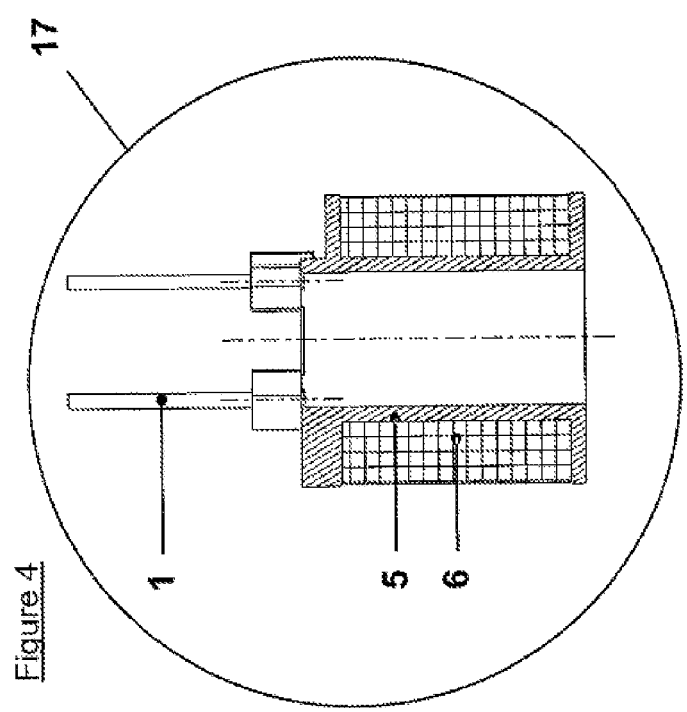

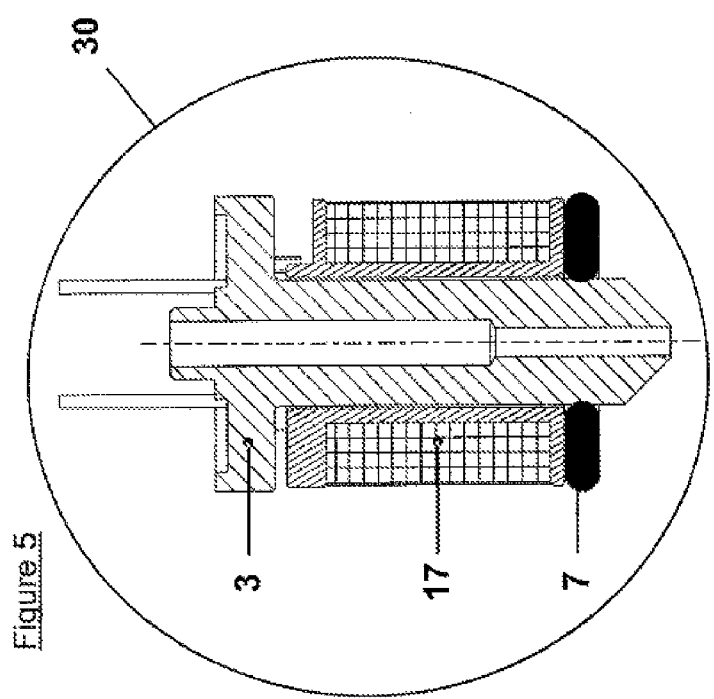

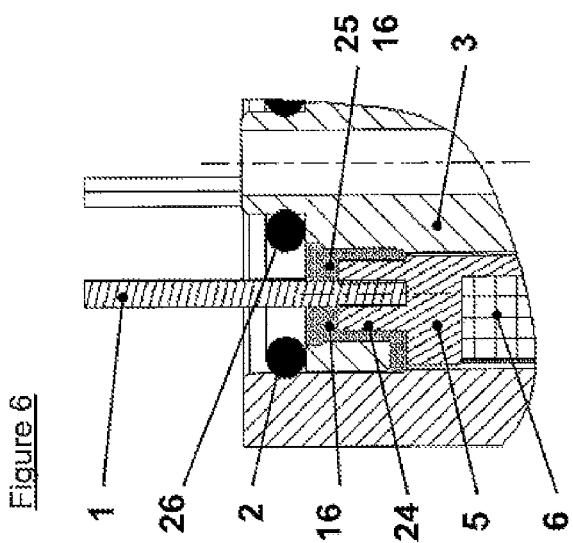

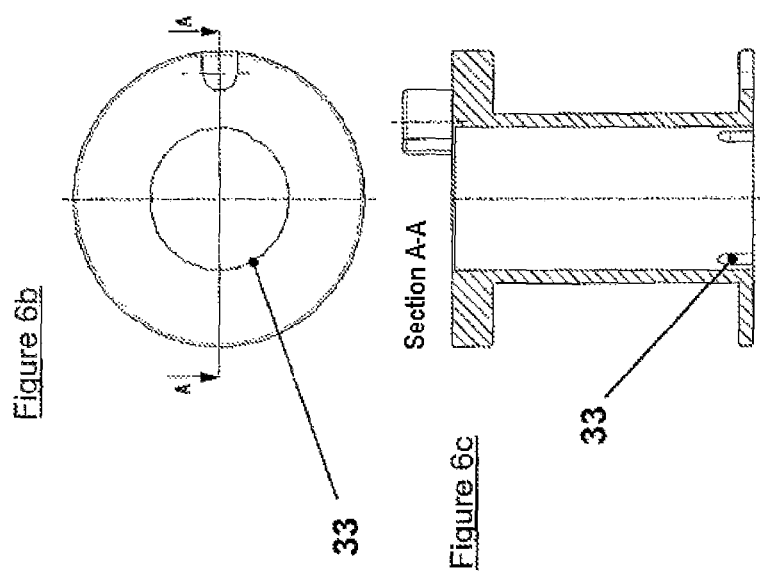

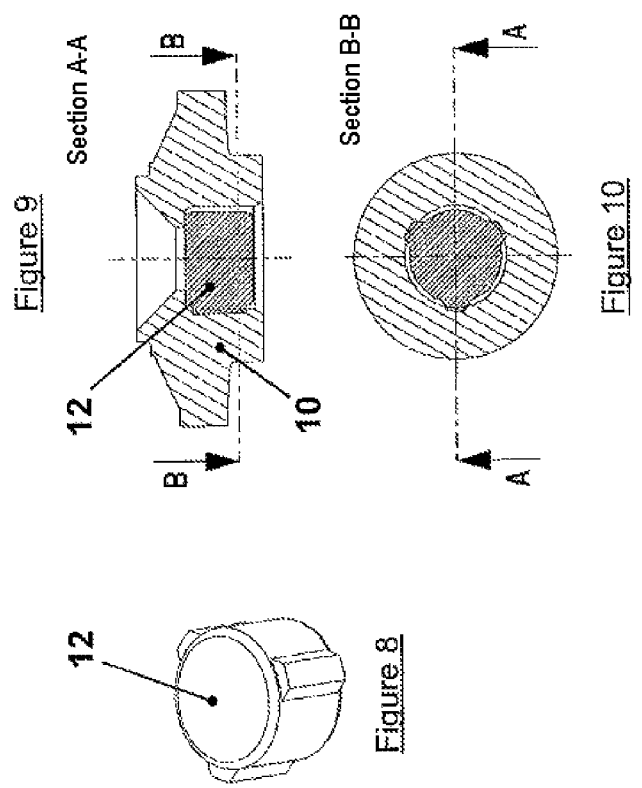

4A

4B

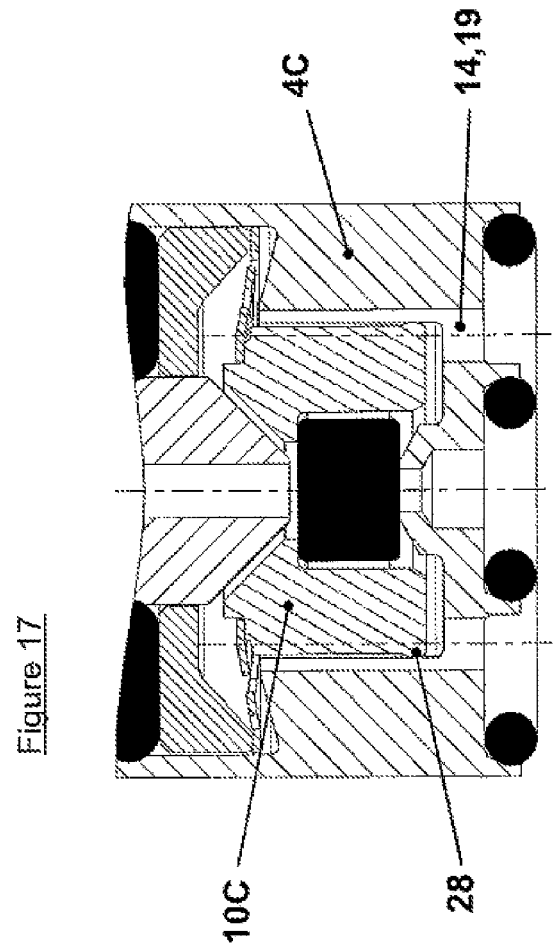

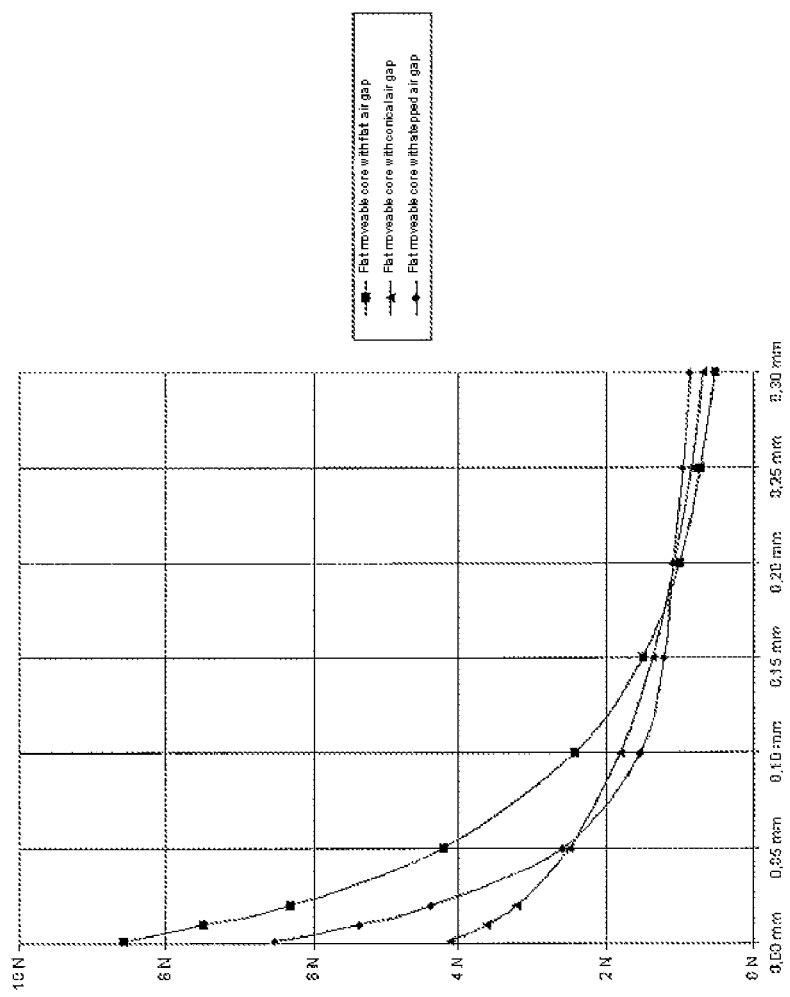

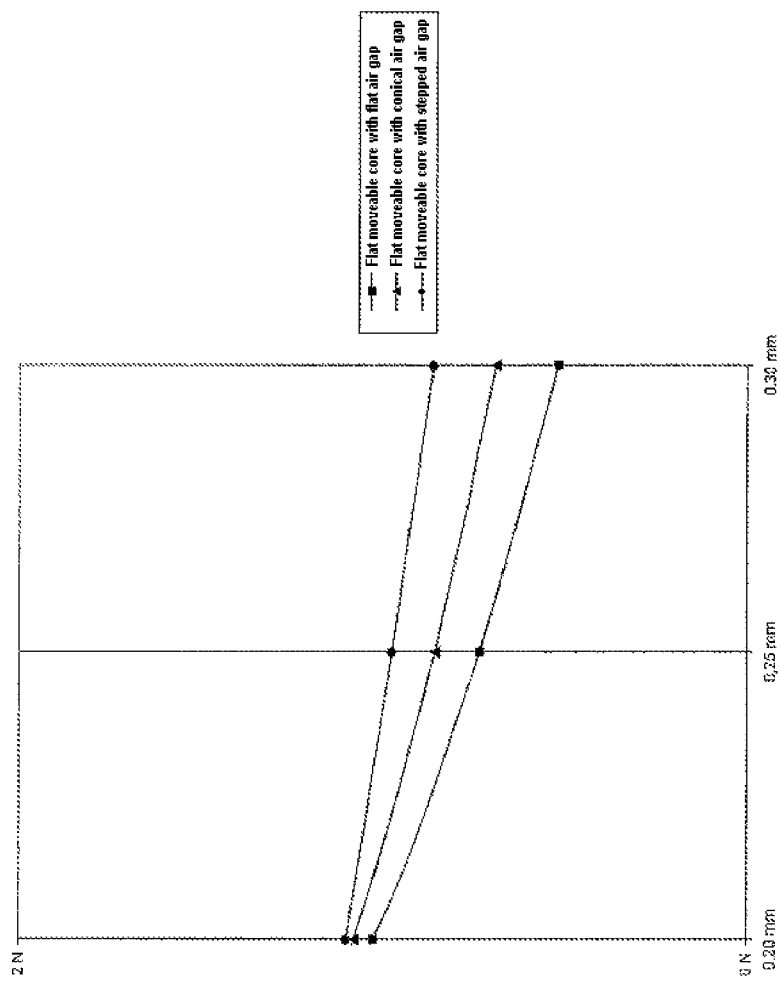

PILOT SOLENOID VALVE

PRIORITY

Priority is claimed as a national stage application, under 35 U.S.C. §371, to PCT/IB2011/050415, filed Jan. 31, 2011, which claims priority to French Application No. 1000398, filed Feb. 2, 2010. The disclosures of the aforementioned priority applications are incorporated herein by reference in their entirety.

The present invention relates to the miniature solenoid valves widely used in controlling compressed-air delivery systems with spool or poppet. These miniature solenoid valves act as an increaser and as a controller of power. Specifically, for an input of low electrical power, often less than 1 W, the controlled pneumatic power at the output is greater than 1 kW.

The principle for constructing miniature solenoid valves is based on electromagnets of which the moveable element can have two types of construction.

The first type of construction is characterized by the cylinder-shaped core penetrating deeply into the central portion of a coil belonging to the electromagnet. This construction is commonly called a plunger-core solenoid valve.

The second type of construction is characterized by the flat-shaped core not penetrating into the central portion of the coil. This construction is commonly called a flat moveable-core solenoid valve.

In the first type of construction using a plunger core, the prior art may be illustrated by document EP 1 536 169. This construction is characterized by an optimization of the magnetic flux to the detriment of the considerable weight of the plunger core. The friction forces are eliminated by the use of two flat springs used notably to guide the plunger core.

In the second type of construction using a flat moveable core, the prior art may be illustrated by document EP 0 549 490. This construction is characterized by a reduced weight of the flat moveable core. A cylindrical spring is used as a return.

The distance travelled by the flat moveable core between its two stable positions is called the travel.

Note that in each of these two constructions, there are two main air gaps:
- the air gap situated perpendicularly to the main axis of the solenoid valve. This air gap is a working air gap. It directly determines the travel of the core and consequently the flow rate of the valve. It is therefore necessary to control the dispersions at this air gap.
- the air gap situated radially to the main axis of the solenoid valve. This air gap is a non-working air gap. It is however necessary to allow the core to move in its housing. It is also necessary to control this air gap in order to limit its impact on the looping of the magnetic flux of the electromagnet.

In both types of construction, the travel of the core depends on the dimensions of a considerable number of parts, but also on the variability of the operating points of the springs as a function of the characteristics of the magnetic forces of the electromagnet. It therefore becomes extremely difficult to produce miniature solenoid valves with a reproducible value of flow rate and to ensure a low absorbed power.

The object of the present invention is notably to propose a miniature solenoid valve with low absorbed power of which the moveable element can be similar to a flat moveable core and of which the travel and the return force of this flat moveable core can be better controlled so that the flow-rate value can be reproduced.

According to the invention, a solenoid valve comprising an electromagnet consisting of a flat moveable core, of a fixed core and of a coil, is characterized in that it comprises a body also belonging to the electromagnet and comprising an opening situated at the upper end of the body opposite the supply orifice, suitable for the insertion of the flat moveable core, of the fixed core and of the coil, the body being secured to a retaining ring made of nonmagnetic material, a flat spring being compressed between the retaining ring and the flat moveable core.

Advantageously, the flat spring associated with the retaining ring allows the adjustment of a preload force used to seal a supply orifice when the valve is in the rest position, and to do so irrespective of the adjustment of the travel of the flat moveable core.

The adjustment of the travel of the flat moveable core may be obtained when the subassembly comprising the coil and the fixed core is installed.

The supply orifice and the usage orifice or orifices may be made in the bottom portion of the body.

The retaining ring may allow the centering of the fixed core.

The supply orifice and the usage orifice or orifices can be made in the bottom, secured to the body.

The carcass of the coil may have several bosses.

The poppet may have a polygonal shape.

The poppet may be of cylindrical shape, a shoulder in the flat moveable core then serving as a retainer.

The poppet may have a shoulder.

A conical spring may be inserted between the shoulder of the poppet and the shoulder of the flat moveable core.

A centering shim, in association with the flat preload spring, may make it possible to center and guide the flat moveable core while limiting the friction through the extreme thinness of the centering shim.

This centering shim may be replaced by a second flat spring, that is not very stiff, prestressed by means of a shoulder in the body and which is used to provide the flat moveable core, in association with the flat return spring, with friction-free guidance with both the body and with any other internal part.

The flat moveable core and the fixed core may have a zone close to the air gap, the geometry of which is stepped in shape.

The external diameter of the flat moveable core may be reduced so as to limit its weight and in that said flat moveable core has a flange instead of the guide shim.

The centering function of the flat moveable core is then obtained, not by a centering shim but by the flange made directly on the external diameter of the flat moveable core.

The external shape of the section of the body may be truncated on at least two opposite faces thus forming flats.

The fluid circuit of the solenoid valve can be sealed from the outside, depending on the construction, by O-rings incorporated into the control solenoid valve or by seals forming an integral part of the apparatus or device receiving the control solenoid valve.

Advantageously, all the fluid channels connecting the solenoid valve to the external devices are rectilinear and therefore have no sharp change of direction of the fluid, hence the absence of additional localized pressure losses so that the flow rate of air is maximum for a slight pressure difference.

The flat moveable core that is used has a particular shape making it possible to produce a characteristic of force as a function of the adopted position by the influence of the geometric parameters of the air gaps. This shape makes it possible to reduce the magnetic air gap without changing the effective travel and to modify the characteristic of attraction of this flat moveable core.

The optimization of the resultant dynamic force is also obtained by reducing as much as possible the volume, and therefore the weight, of the flat moveable core. The variability of the operating points of the flat spring is limited by an "in situ" adjustment of the latter, ensuring the value of the low absorbed power.

The miniature solenoid valve according to the invention may also include a one-piece structure of the body connecting the electromagnetic portion to the fluid, in this instance pneumatic, portion. In this way, several main functions of the solenoid valve are performed in a single part making it possible to limit the number of components and to reduce the assembly dispersions. This optimization may therefore have a not inconsiderable impact on the cost of the product.

In this type of construction, the flow rate of the supply orifice is directly controlled by the position of the flat moveable core, an element of the electromagnetic and pneumatic system.

Other features and advantages of the invention will appear in the description that follows of a preferred embodiment with reference to the appended drawings but that is in no way limiting.

Figure 7:
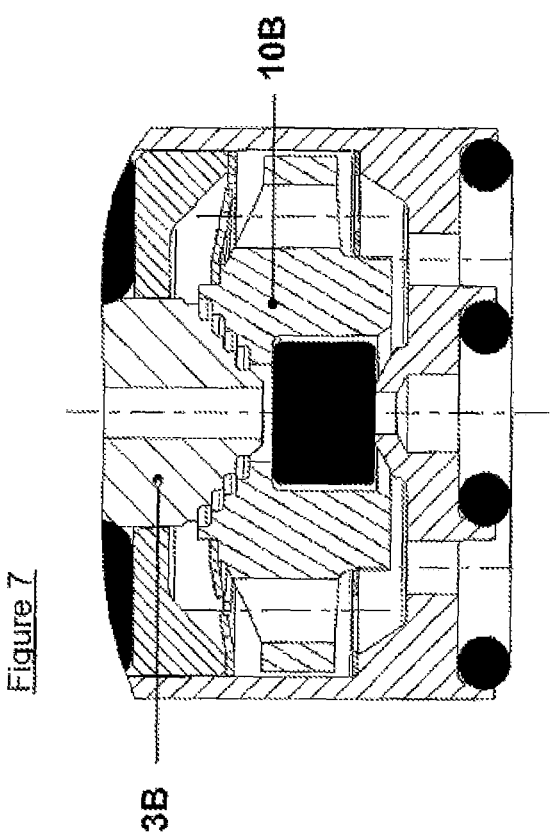
Figure 7B:
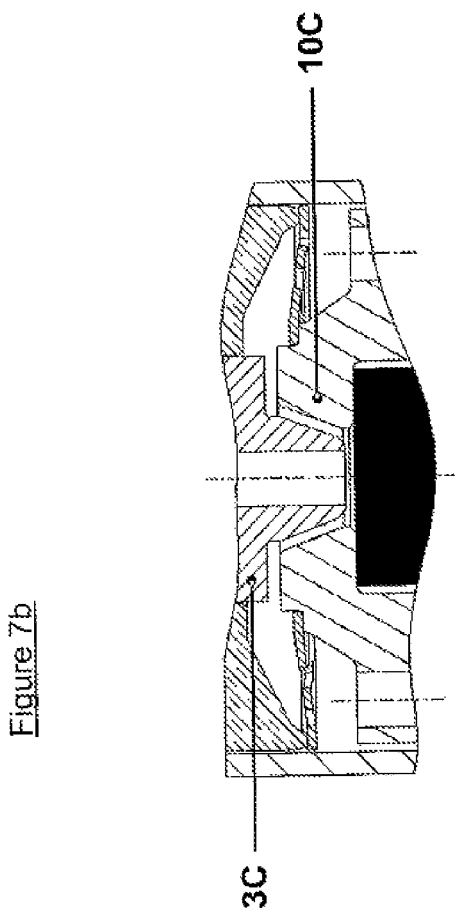
Figure 9B:
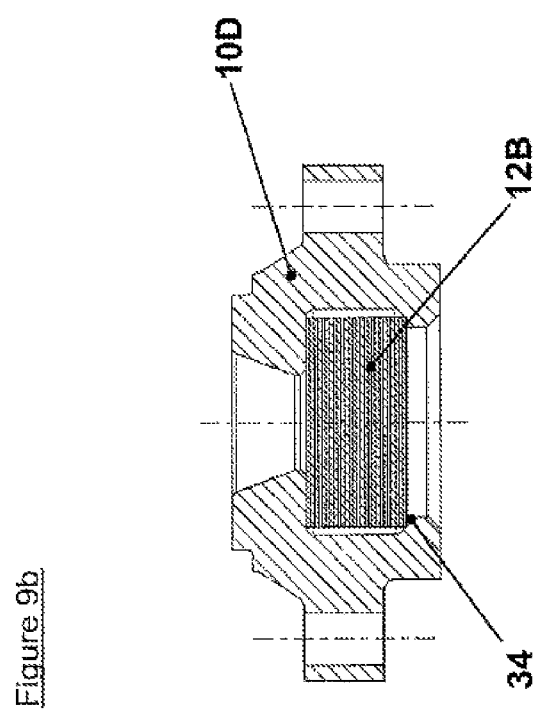
Figure 9C:
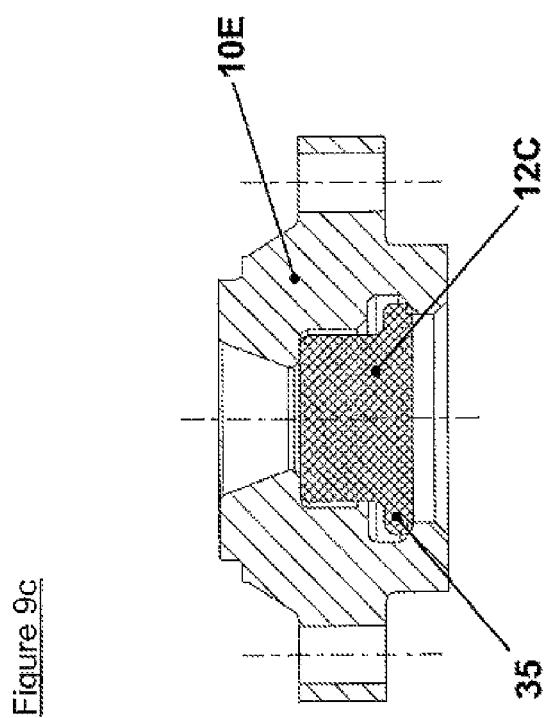
Figure 9D:
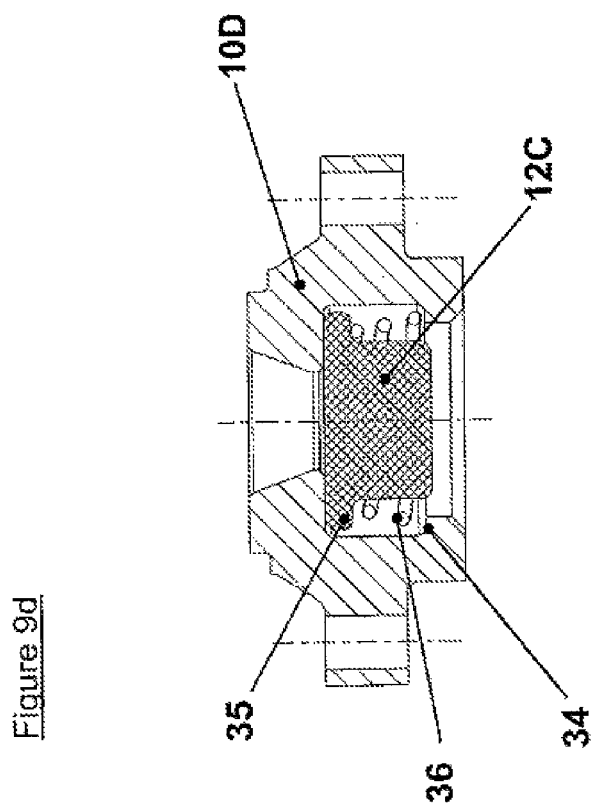
Figure 11:
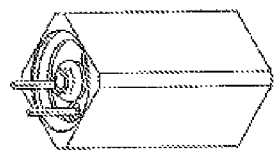
Figure 12:
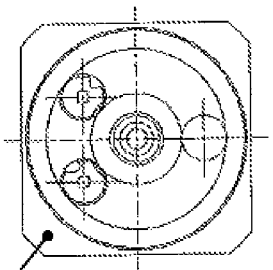
Figure 13:
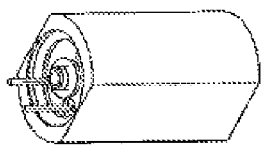
Figure 14:
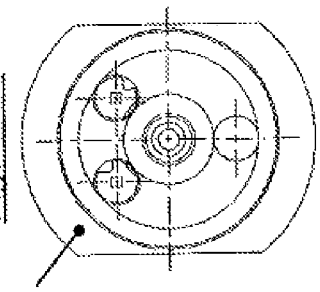
Figure 15:
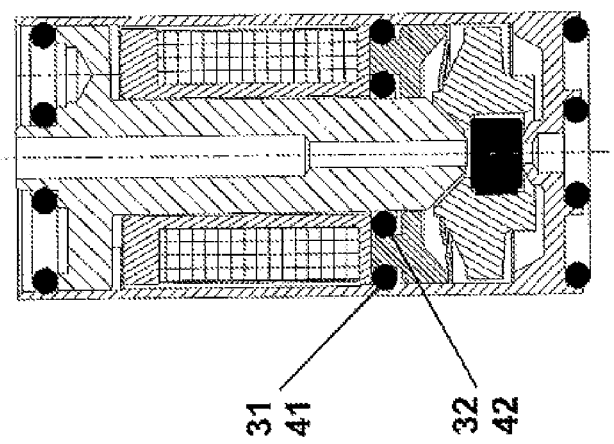
Figure 16:
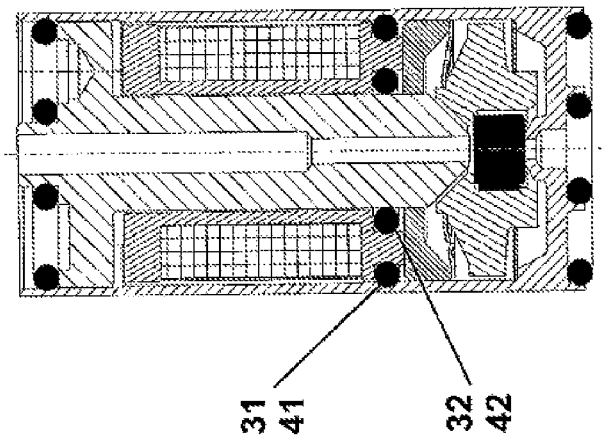

In these drawings:

FIG. 1 is a longitudinal section along the plane B-B of a solenoid valve according to the invention that is switched off, FIG. 2 is a longitudinal section along the plane A-A of a solenoid valve according to the invention that is switch off, FIG. 3 is a longitudinal section of the solenoid valve of FIG. 2 that is switched on, FIG. 4 is a detail illustrating the constitution of the coil of the solenoid valve of FIG. 1, FIG. 5 is a detail illustrating the coil subassembly of the solenoid valve of FIG. 1, FIG. 6 is a detail illustrating the assembly of the coil subassembly of FIG. 5, FIG. 6b is a detail illustrating the bosses incorporated into the main bore of the carcass defined in FIG. 4, FIG. 6c is a longitudinal section along the plane A-A of FIG. 6b, FIG. 7 illustrates an alternate embodiment of the shape of the flat moveable core of the solenoid valve of FIG. 1, FIG. 7b illustrates an alternate embodiment of the shape of the flat moveable core of the solenoid valve of FIG. 1, FIG. 8 is a view in perspective of a poppet used in the solenoid valve of FIG. 1, FIG. 9 is a longitudinal section along the plane A-A of the poppet according to FIG. 8, inserted into the flat moveable core of the solenoid valve of FIG. 1, FIG. 9b illustrates an alternate embodiment of the shape of the poppet illustrated in FIG. 9 of the solenoid valve of FIG. 1, FIG. 9c illustrates another alternate embodiment of the shape of the poppet illustrated in FIG. 9 of the solenoid valve of FIG. 1, FIG. 9d illustrates the presence of a conical spring between the poppet illustrated in FIG. 9 and the core of the solenoid valve of FIG. 1, FIG. 10 is a longitudinal section along the plane B-B of the poppet mounted in the flat moveable core, according to FIG. 9, inserted into the flat moveable core of the solenoid valve of FIG. 1, FIG. 11 is a view in perspective of a first embodiment of the body of the solenoid valve of FIG. 1, FIG. 12 is a view from above of FIG. 11, FIG. 13 is a view in perspective of a second embodiment of the body of the solenoid valve of FIG. 1, FIG. 14 is a view from above of FIG. 13, FIGS. 15 and 16 are sections similar to FIG. 2 illustrating alternate internal sealing solutions, FIG. 17 illustrates an alternate embodiment of the shape of the body and of the flat moveable core of the solenoid valve of FIG. 1, FIG. 18 is a schematic curve representing the influence of the shape of the magnetic air gap on the attraction curve of the flat moveable core, and FIG. 19 is an enlargement of FIG. 18 in the zone close to the working air gap.

FIGS. 1 and 2 show a solenoid valve according to the invention.

The magnetic portion of the solenoid valve allowing the looping of the magnetic flux generated by the coil 17 consists of a body 4, a fixed core 3 and a flat moveable core 10 made of a ferromagnetic material.

The flat moveable core 10 moves along the main axis of the solenoid valve between the fixed core 3 and the bottom portion of the body 4.

The flat moveable core 10 which moves along the main axis of the solenoid valve is subjected to an elastic return force due to the flat spring 9. This force that can be adjusted on installation is called the preload.

The fluid portion of the solenoid valve consists of the body 4, the fixed core 3 and the flat moveable core 10 comprising a two-faced poppet 12. The fluid portion of the solenoid valve is used to control the flow rates of air from the supply orifice 18 to the usage orifice or orifices 19 or from the usage orifice or orifices 19 to the discharge orifice 20. An alternate construction consists in controlling the passage of the fluid only between the supply orifice 18 and the usage orifice 19.

The sealing of the fluid circuit of the solenoid valve is obtained on the one hand by an oblong seal 7 trapped between the coil carcass 5 and a retaining ring 8 providing internal sealing, and on the other hand by the four O-rings 2, 13, 15 and 26 providing the external seal.

This external sealing function may also be carried out by one or more external seals (not shown) forming an integral part of the apparatus or of the device receiving the control solenoid valve, and thereby replacing one or more O-rings 2, 13, 15 and 26.

Note that the retaining ring 8 is made of a nonmagnetic material so as not to influence the characteristics of the magnetic field.

The supply orifice 18 and the usage orifice or orifices 19 are made in the bottom portion of the body 4 called the bottom 4D. Contrary to the embodiment usually adopted in the prior art, the bottom 4D is secured to the body 4. This notably allows the assembly dispersions to be limited and thereby makes for a more precise adjustment of the position of the ring 8 and of the travel of the flat moveable core 10.

FIG. 3 illustrates the solenoid valve switched on. The core 10 furnished with the poppet 12 is then in the top position and butting against the fixed core 3. In this way the discharge orifice 20 is closed off by the action of the poppet 12 on the seat 22.

Shown in FIG. 4 is the constitution of the coil 17. The coil 17 consists of a coil carcass 5, a winding 6 and two electrical connector pins 1.

The coil 17, an oblong seal 7 and the fixed core 3 form a coil subassembly 30, the constitution of which is more particularly illustrated in FIG. 5. The coil 17 is slid along the axis of the fixed core 3 until it butts against the latter. The oblong seal 7 is mounted on the fixed core 3 so as to keep the coil 17 on the fixed core 3.

The connection zone of the coil subassembly 30 is more particularly visible in FIG. 6. The connector pins 1 and their supports 24 provided in the coil carcass 5 pass through the fixed core 3 through two through-holes 25 provided for this purpose. A resin 16 may be injected between the fixed core 3 and the coil carcass 5 in order to secure the coil 17 and the fixed core 3. This operation is carried out after insertion of the coil subassembly 30 into the body 4.

An alternative to the use of the resin 16 consists in incorporating several bosses 33 into the main bore of the carcass 5 as described in FIGS. 6b and 6c so that the fixed core 3 is mounted under stress in the coil 17.

FIG. 7 illustrates an alternate embodiment 10B of the shape of the flat moveable core 10. In this instance the object is to achieve a particular magnetic force characteristic between the flat moveable core 10B and the end of the fixed core 3B. For this purpose, particular geometries are used in the zones close to the working air gap. In comparison with a conventional flat working air gap and in the vicinity of the rest position, the magnetic flux is more marked for a conical shape (FIG. 1) or stepped shape (FIG. 7) allowing an identical attraction characteristic for a reduced consumption of electrical power. In other words, the efficiency of the electromagnet in the vicinity of the working air gap is higher when using one or other of these two geometries.

It is not out of the question to partially produce one or other of these two air gap geometries, in combination with a conventional flat portion, for the purpose of obtaining a fair compromise between feasibility, reliability and performance of the product. A combination of conical and flat air gap applied to the flat moveable core 10C and to the fixed core 3C is illustrated in FIG. 7b.

The insertion of the poppet 12, illustrated in FIG. 8 into the flat moveable core 10 is more particularly illustrated in FIGS. 9 and 10. This poppet 12 of polygonal shape is inserted into a circular piercing of the flat moveable core 10. This particular shape, polygonal, inserted into a circular hole advantageously makes it possible to keep the poppet in its housing while preventing any deformation of the bearing surfaces on the seats 21, 22 and ensuring all the flaws relating to the closure of the poppet mold are removed.

More conventionally, the poppet 12B may be of cylindrical shape, a shoulder 34 in the flat moveable core 10D then serving as a retainer. This option is illustrated in FIG. 9b.

Another geometry of the poppet 12C showing a shoulder 35 may also be produced so as to obtain a greater flexibility of the poppet 12C inside the flat moveable core 10E making it possible to promote the contact between the flat moveable core 10E and the fixed core 3 when the coil 17 is switched on. This option is illustrated in FIG. 9c.

It is also possible to insert under stress a conical spring 36 between the shoulder 35 of the poppet 12C and the shoulder 34 of the flat moveable core 10D. This alternative is illustrated in FIG. 9d.

The design of the solenoid valve allows all the internal components to be installed through the rear of the body 4, through an opening 23 notably suitable for the insertion of the flat moveable core 10, of the fixed core 3 and of the coil 17. The design of the solenoid valve also permits the travel adjustments and the preload to be independent. The installation of the various elements of the solenoid valve is explained below.

The centering shim 11 and the flat moveable core assembly 10, 12 are placed in the bottom portion of the body 4. The flat spring 9 is then inserted and comes into contact with the flat moveable core assembly 10, 12.

The retaining ring 8 is inserted into the body 4 until contact with the flat spring 9. The flat spring 9 applies the preload onto the flat moveable core assembly 10, 12 and the flat moveable core assembly 10, 12 comes into contact with the supply orifice 18. The preload force is then verified by an appropriate means.

When the position of the retaining ring 8 is such that the preload force reaches a correct predefined value, the retaining ring 8 is swaged onto the body 4.

The coil subassembly 30 is then inserted into the body 4 to a position such that the travel reaches a satisfactory value. During this operation, the value of the travel is verified by alternating positions between the rest position, coil switched off, and the actuated position, coil switched on, so that the travel is defined with an accuracy of the order of a few tens of micrometers.

The retaining ring 8 also has the function of centering the bottom portion of the fixed core 3 relative to the flat movable core 10 when the coil subassembly 30 is inserted into the body 4.

The body 4 and the coil subassembly 30 are then swaged through the fixed core 3 in the top portion of the solenoid valve.

In the rest position, with the coil switched off, the supply orifice 18 is closed off by the poppet 12, by virtue of the preload applied by the flat spring 9 on the flat moveable core 10 making it possible to maintain a force on the seat 21 of the supply orifice 18 that is necessary for isolating the latter from the other orifices 19 and 20. The usage orifice or orifices 19 and the discharge orifice 20 are then in communication, through one or more communication orifices 14 of the flat moveable core 10. Note that the flat spring 9 and the centering shim 11 are sufficiently opened up so as not to disrupt the passage of the fluid.

In the actuated position, with the coil switched on, the flat moveable core 10 is magnetically attracted by the fixed core 3 until contact between these two parts, called sticking. The discharge orifice 20 is then closed off by the poppet 12. The pressure applied on the latter by the compressed air originating from the supply orifice 18 makes it possible to maintain a force on the seat 22 of the discharge orifice 20, that is necessary to isolate the latter from the other orifices 18 and 19. The supply orifice 18 and the usage orifice or orifices 19 are then in communication.

FIGS. 11 to 14 illustrate exemplary embodiments of the body 4, of which the lateral faces may be truncated on two opposite faces (FIGS. 13 and 14) or on four faces (FIGS. 11 and 12). The lateral faces then become flats. The localized reduction of the thickness of body 4 thus caused optimizes the operations of swaging the coil subassembly 30 and the body 4 and the retaining ring 8 with this same body 4, while retaining a necessary and sufficient cross section of magnetic material in the thick zones in order to ensure the circulation of the magnetic flux without saturation. These embodiments also make it possible to limit the lateral bulk of the product in at least one direction.

FIGS. 15 and 16 illustrate alternate embodiments relating to the use of the oblong-shaped seal 7 providing the internal seal of the product. This oblong seal 7 is then replaced by two O-rings 31 and 32 of which the respective housings 41 and 42 are made either in the coil carcass 5 (FIG. 15) or in the retaining ring 8 (FIG. 16).

FIG. 17 illustrates an alternate embodiment 4C of the body 4 and 10C of the flat moveable core 10. In this embodiment, the external diameter of the flat moveable core 10C is reduced in order to further limit the impact of the weight of this flat moveable core 10C on the performance of the product. The guide shim 11 is then left out and the guide function of the flat moveable core 10C is then replaced by a flange 28 made on the flat moveable core 10C. This flange 28 is of dimensions to limit to the maximum the friction between the flat moveable core 10C and the body 4C. In this embodiment, the communicating orifice or orifices 14, 19 are made in the body 4C.

FIG. 18 illustrates the influence of the geometry of the air gap on the attraction curve of the flat moveable core. The attraction force is indicated on the y axis while the air gap is indicated on the x axis. Three geometries are considered: a flat moveable core with a flat air gap, a flat moveable core with a conical air gap, a flat moveable core with a stepped air gap.

In the solution using a flat moveable core with a flat air gap, excluding the very particular case of an extremely small air gap value, there is no saturation before sticking. The curve representing the attraction force has the shape of a hyperbola. The attraction force is very strong on sticking, but weak at the working air gap (rest position).

In the solution using a flat moveable core with a conical air gap, the level of magnetic flux of the conical portion is almost independent of the size of the air gap. The consequence of this effect is that the attraction force is practically constant throughout the travel and the overall variation of the attraction force between sticking and the maximum air gap is reduced by half relative to the solution using a flat moveable core with a flat air gap. On the other hand, if consideration is given to a working air gap of 0.25 mm, the attraction force of the core is approximately 18% higher than that of a flat moveable core with a flat air gap.

In the solution using a flat moveable core with a stepped air gap, a practically constant attraction force is likewise obtained for approximately 50% of the travel. But the different distribution of the magnetic flux of the levels forming the stepping of the core leads, for the very small air gaps, to an increase in the sticking force. The attraction force when sticking nevertheless remains weaker than the case of a solution using a flat moveable core with a flat air gap. However, the major advantage of this solution is that it provides a saving in force of approximately 33% relative to the solution of a flat moveable core with a flat air gap, also considering a working air gap of 0.25 mm.

The invention claimed is:

1. A solenoid valve comprising:
   an electromagnet having a flat moveable core made of a ferromagnetic material, a fixed core, and a coil;
   a body including an opening situated at a rear of the body opposite a supply orifice, the opening being configured for insertion of the flat moveable core, the fixed core, and of the coil;
   a retaining ring made of nonmagnetic material and swatted onto the body to secure the body to the retaining ring; and
   a flat spring compressed between the retaining ring and the flat moveable core, a face of the flat spring opposed to the retaining ring contacting only the flat moveable core,
   wherein the fixed core and the retaining ring are independently affixed to the body.

2. The solenoid valve as claimed in claim 1, wherein the flat spring associated with the retaining ring allows the adjustment of a preload force used to seal the supply orifice when the valve is in a rest position, and to do so irrespective of the adjustment of the travel of the flat moveable core.

3. The solenoid valve as claimed in claim 1, wherein adjustment of the travel of the flat moveable core is obtained when the coil and the fixed core are installed.

4. The solenoid valve as claimed in claim 1, wherein the retaining ring allows centering of the fixed core.

5. The solenoid valve as claimed in claim 1, wherein the supply orifice and one or more usage orifices are included in a bottom, secured to the body.

6. The solenoid valve as claimed in claim 1, wherein a carcass of the coil has several bosses.

7. The solenoid valve as claimed in claim 1, wherein the flat moveable core includes a poppet.

8. The solenoid valve as claimed in claim 7, wherein the poppet has a polygonal shape.

9. The solenoid valve as claimed in claim 7, wherein the poppet is of cylindrical shape, a shoulder in the flat moveable core serving to retain the poppet.

10. The solenoid valve as claimed in claim 9, wherein the poppet has a shoulder.

11. The solenoid valve as claimed in claim 1, wherein the flat moveable core and the fixed core comprise, in the vicinity of the air gap, a zone of stepped shape.

12. The solenoid valve as claimed in claim 1, wherein the external diameter of the flat moveable core is reduced so as to limit its weight and in that said flat moveable core has a flange instead of a guide shim.

13. The solenoid valve as claimed in claim 1, wherein an external shape of a section of the body is truncated over at least two opposite faces, thus forming flats.

14. The solenoid valve as claimed in claim 1, wherein fluid channels connecting the solenoid valve to the external devices are rectilinear.

15. The solenoid valve as claimed in claim 1, the body comprising a magnetic material and a localized reduction of the thickness of the material, while retaining a sufficient cross section of the material in thick zones in order to ensure circulation of magnetic flux without saturation.

16. The solenoid valve as claimed in claim 1, wherein:
   the flat spring has a preload force sealing the flat movable core against a supply orifice when the valve is in a rest position, the preload force being determined by a position of the retaining ring affixed to the body; and
   the flat movable core has a travel distance between the rest position and an actuated position of the valve, the flat movable core sealing against a discharge orifice formed in the fixed core when the valve is in the actuated position, with the travel distance being determined by a position of the fixed core affixed to the body.

17. The solenoid valve as claimed in claim 1, wherein the flat movable core seals against a supply orifice when the valve is in a rest position, and the flat movable core seals against a discharge orifice formed in the fixed core when the valve is in an actuated position.

18. The solenoid valve as claimed in claim 1, further comprising a fluid seal disposed between and sealing between the coil and the retaining ring.

19. A solenoid valve comprising:
   an electromagnet having a flat moveable core made of a ferromagnetic material, a fixed core, and a coil;
   a body including an opening situated at a rear of the body opposite a supply orifice, the opening being configured for insertion of the flat moveable core, the fixed core, and of the coil;
   a retaining ring made of non-magnetic material, and swaged onto the body to secure the body to the retaining ring; and
   a flat spring compressed between the retaining ring and the flat moveable core, a face of the flat spring opposed to the retaining ring contacting only the flat moveable core;

wherein the flat moveable core includes a poppet, the poppet is of cylindrical shape, a shoulder in the flat moveable core serving to retain the poppet, and wherein the poppet has a shoulder; and wherein a conical spring is inserted between the shoulder of the poppet and the shoulder of the flat moveable core.

* * * * *